Patented June 5, 1934

1,961,194

UNITED STATES PATENT OFFICE 1,961,194

CORROSION INHIBITOR

William S. Calcott, Penns Grove, N. J., assignor to E. I. du Pont de Nemours & Company, Wilmington, Del., a corporation of Delaware No Drawing. Application October 25, 1932, Serial No. 639,485

10 Claims. (Cl. 23—239)

This invention relates to the inhibition of corrosion of materials and apparatus subject to contact with and/or employed in the handling, transportation, and storage of solutions containing ammonia and carbon dioxide and/or compounds thereof, such, for example, as solutions of ammonium carbonate, ammonium bicarbonate, ammonium carbamate, or more particularly solutions such as may be derived from urea synthesis melts, comprising varying proportions of urea, ammonia, carbon dioxide, and water.

It is known that solutions of the character described, when in contact with apparatus constructed of ferrous materials, exert a deleterious corrosive effect thereupon. As a consequence of this corrosive action, recourse has been had to the use of noble metals, highly expensive alloys, or to equally expensive lined equipment that are not appreciably attacked. This corrosion situation has resulted in placing an uneconomical cost disadvantage upon the handling of such materials.

It is an object of the present invention to avoid the corrosion problem above outlined and to make possible the utilization of relatively inexpensive ferrous materials by providing a method for inhibiting corrosion of said materials which are subject to contact with ammonia-carbon dioxide-containing solutions.

Other objects and advantages of the invention will be apparent by reference to the following specification wherein its details and preferred embodiments are described.

According to my invention corrosion of ferrous materials subject to contact with ammonia-carbon dioxide-containing solutions such as urea synthesis melts, or the like, can be greatly reduced if not wholly obviated by adding to said solution a relatively small amount of the solids contained in sulfite liquor, i. e. the liquor resulting from treatment of wood according to the well known bisulfite treatment. The form in which the sulfite liquor may be utilized according to my invention is subject to considerable variation. Thus, if, due to freight charges and the like, it is desired to overcome the cost disadvantages of utilizing dilute sulfite liquor directly as it is obtained from the paper mill, a more concentrated solution or only the solids contained therein may be used. For example, I have found that if the solids which may be recovered from sulfite liquor by evaporation are added to an ammonia-carbon dioxide solution in amount corresponding to 0.5% by weight corrosion will be materially if not wholly reduced.

When added as dilute sulfite liquor, or as the solids obtained from the same, to an ammonia-carbon dioxide solution, any calcium which may be contained in said liquor or solids will precipitate as the carbonate. Therefore, I prefer preliminarily to remove the calcium in order to avoid the handling, otherwise necessary, of a considerably augmented volume of liquid. Consequently I subject the sulfite liquor, in a form such as hereinbefore described, to treatment with ammonia and carbon dioxide, or equivalents, for the precipitation and removal of the calcium content as insoluble carbonate before utilizing said liquor or solids as a corrosion inhibitor.

Although sulfite liquor or the solids contained therein, may be utilized in varying amounts as a satisfactory corrosion inhibitor, I have found that relatively small quantities are sufficient greatly to retard if not wholly to inhibit the corrosive action of ammonia-carbon dioxide containing solutions upon ferrous materials.

It will be understood that the invention is susceptible of considerable variation in practice, particularly with respect to the specific proportions of materials used in inhibiting corrosion as well as the composition of the ammonia-carbon dioxide containing solutions, although the following example will serve to illustrate the preferred procedure.

It will also be understood that where reference is made in the following claims to sulfite liquor solids it is intended to include, conforming to the invention as hereinbefore described, the use of these materials as such or in the form of a solution.

Furthermore, it will be understood that where, in the specification and the claims, reference is made to the synthesis of urea from ammonia and carbon dioxide it is intended to include and shall be taken as including ammonia and carbon dioxide broadly, as such, as well as in the form of compounds of the same, such, for example, as in the form of ammonium carbonate, ammonium bicarbonate, ammonium carbamate, and the like.

*Example.*—To a modified urea synthesis melt comprising 34.6% by weight of urea, 24.7% ammonia, 30.5% water, and ammonia and carbon dioxide equivalent to 10.2% ammonium carbamate there was added about 0.5% sulfite liquor solids (containing no free water) obtained from commercial calcium sulfite liquor by evaporation thereof after separation of the calcium content by precipitation and filtration. This solution, ordinarily corrosive to ferrous materials in the absence of sulfite liquor, was placed in contact with mild steel. No appreciable corrosion at ordinary temperatures was found at the end of two weeks.

Although the example refers to the utilization of sulfite liquor solids obtainable from a sulfite liquor containing calcium, it will be understood that sulfite liquor from other sulfite cooks may likewise and as advantageously be used, as for example, the cooking liquor obtainable from an ammonium bisulfite cook, a mixed alkali bisulfite cook, or the like. It will be apparent that were a sulfite liquor used, such as obtainable from an ammonium bisulfite cook, the calcium removal step hereinbefore described in the example could be dispensed with to advantage.

By elimination of corrosion of ferrous materials according to this invention, it is economically practical to employ mild steel as a material of construction for apparatus utilized in the handling, storage, and transportation of ammonia-carbon dioxide containing solutions such as urea synthesis melts.

Various changes may be made in carrying out the invention without departing therefrom or sacrificing any of the advantages thereof.

I claim:

1. The method of inhibiting corrosion of ferrous materials subject to attack by ammonia-carbon dioxide-containing solutions which comprises adding sulfite liquor solids to such solutions.

2. The method of inhibiting corrosion of ferrous materials subject to attack by urea synthesis melts producible from ammonia and carbon dioxide which comprises adding sulfite liquor solids to such melts.

3. The method of inhibiting corrosion of ferrous materials subject to attack by ammonia-carbon dioxide-containing solutions which comprises adding sulfite liquor solids thereto in the proportion of from 0.1 to 1.5% by weight of said solutions.

4. The method of inhibiting corrosion of ferrous materials subject to attack by ammonia-carbon dioxide-containing solutions which comprises adding sulfite liquor solids thereto in the proportion of 0.5% by weight of said solutions.

5. A composition of matter comprising an ammonia-carbon dioxide-containing solution containing sulfite liquor solids.

6. The method of inhibiting corrosion of ferrous materials subject to attack by urea synthesis melts producible from ammonia and carbon dioxide which comprises adding sulfite liquor solids thereto in the proportion of from 0.1% to 1.5% by weight of said melt.

7. The method of inhibiting corrosion of ferrous materials subject to attack by urea synthesis melts producible from ammonia and carbon dioxide which comprises adding sulfite liquor solids thereto in the proportion of 0.5% by weight of said melt.

8. A composition of matter comprising a urea synthesis melt producible from ammonia and carbon dioxide containing sulfite liquor solids.

9. A composition of matter comprising a urea synthesis melt producible from ammonia and carbon dioxide containing from 0.1% to 1.5% by weight sulfite liquor solids.

10. A composition of matter comprising a urea synthesis melt producible from ammonia and carbon dioxide containing about 0.5% by weight sulfite liquor solids.

WILLIAM S. CALCOTT.